Nov. 6, 1923.  1,472,810

H. OSSWALD

PRESS

Filed May 22, 1920   10 Sheets-Sheet 1

Fig.1

Herman Osswald
INVENTOR

BY
Ivan E. A. Konigsberg
ATTORNEY

Nov. 6, 1923.

H. OSSWALD

PRESS

Filed May 22, 1920    10 Sheets-Sheet 3

Inventor
Herman Osswald
By his Attorney

Nov. 6, 1923.

H. OSSWALD

PRESS

Filed May 22, 1920

INVENTOR
Herman Osswald
BY
Ivan E. A. Konigsberg
ATTORNEY

Nov. 6, 1923.

H. OSSWALD

PRESS

Filed May 22, 1920

INVENTOR
Herman Osswald
BY
Ivan E. A. Kingsbury
ATTORNEY

Nov. 6, 1923. 1,472,810
H. OSSWALD
PRESS
Filed May 22, 1920 10 Sheets-Sheet 7

Nov. 6, 1923.

H. OSSWALD

PRESS

Filed May 22, 1920    10 Sheets-Sheet 8

INVENTOR
Herman Osswald
BY
Ivan E. A. Konigsberg
ATTORNEY

Patented Nov. 6, 1923.

1,472,810

UNITED STATES PATENT OFFICE.

HERMAN OSSWALD, OF RICHMOND HILL, NEW YORK.

PRESS.

Application filed May 22, 1920. Serial No. 383,355.

*To all whom it may concern:*

Be it known that I, HERMAN OSSWALD, a citizen of the United States, and resident of Richmond Hill, in the county of Queens and State of New York, have invented certain new and useful Improvements in Presses, of which the following is a specification.

This invention relates to presses or machines for cutting and forming metal or other materials into semi-finished or wholly finished articles of manufacture. The object of the invention is to provide a generally improved press embodying several novel and useful features particularly with respect to the feeding and manipulation of the stock, while the same is being cut, formed or otherwise manipulated by the press. Other ancillary objects will appear and be pointed out as this specification proceeds while reference is had to the accompanying drawings in which.

The press illustrated herein is adapted to make automatically caps or closures, lids, gaskets and a large variety or other or similar sheet metal articles which are adapted to be manufactured on power presses into finished or semi-finished commercial articles by the cooperation of suitable dies and punches. Such articles are usually cut from a strip of suitable stock or material and undergo in the machine several operations, each one preparatory for the succeeding one, until the finished article is finally ejected from the machine or press.

One important feature in handling the blank from one operation to another consists in the mechanism or device for automatically transferring the blank from one die to another die.

For the purpose of disclosing the several novel features of the machine, it is illustrated as being equipped with punches and dies for manufacturing a cap or lid for bottles, jars or other containers, and the cap or lid is one which requires flexing and a paper seal and sometimes a paper gasket to adapt it for its ultimate use.

It should, however, be clearly and distinctly understood that the illustration herein of a specific cap is made solely for the purpose of showing clearly the several novel features of the invention, and is not to be construed as a limitation, but as an example.

Referring now to the drawings the reference numeral 1 denotes the main frame of the press which is suitably mounted on a base 2. At the top is located the driving shaft 3 which reciprocates the slide 4 in the vertical guides 5, 5. The slide carries a punch holder 6 and the frame supports a bolster 7.

The operations to which the sheet metal or stock is subjected in this machine are six in number, namely, blanking, forming, crimping, providing with paper seal, paper gasket and closing. The number of operations may be more or less and the kind of operations performed may be different from those named, which have been selected simply because they clearly illustrate by example the range of work which may be done on a press of this type as will all more fully appear hereinafter.

The dies in the machine are supported or located in the die bed 8 which is secured to the bolster 7, while the punches which cooperate with the dies are carried by the punch holder 6. The die bed extends longitudinally of the machine from the front at 9 to the rear at 10, Figure 3, and is provided with a longitudinal cut out or slide way 11 extending from the front to the rear where the die bed is provided with a rearwardly and downwardly inclined discharge chute 12. In the slide way 11 slides the transferring slide 13 which is provided with as many apertures plus one as there are dies and punches on the press. In this instance the transferring slide is apertured at 14, 15, 16, 17, 18, 19 and 20, the last one merging into a cut out at 21, Fig. 3. The transfer slide is operable into two positions, a forward and a rearward, and front and rear adjustable stops 22 and 23 respectively are provided to definitely position the transfer slide. The apertures in the transfer slide coincide centrally with the centres of the respective cooperating punches and dies in either of the two positions referred to.

The article which has been selected as illustrative of the range of work within the scope of this invention is a cap of the so called self closing type. That is, a cap provided with a circular split flange which is adapted to grip the mouth of the container to which it is applied without any further means than that furnished by the flexing upwardly of the cap when applied. Conversely, the cap is removed by a pressure upon the central portion thereof, which causes the split flange to move outwardly and loose its grip upon the mouth of the container so that the cap may be readily removed and thus used over and over again.

In addition the cap is provided with a paper seal and paper gasket to effect tight closure. It will be seen as this specification proceeds that such a cap presents a good example of practically the complete range of work of the press, in that it involves flexing of the cap body in addition to the blanking and forming operations as well as inserting the paper elements.

Figure 7:
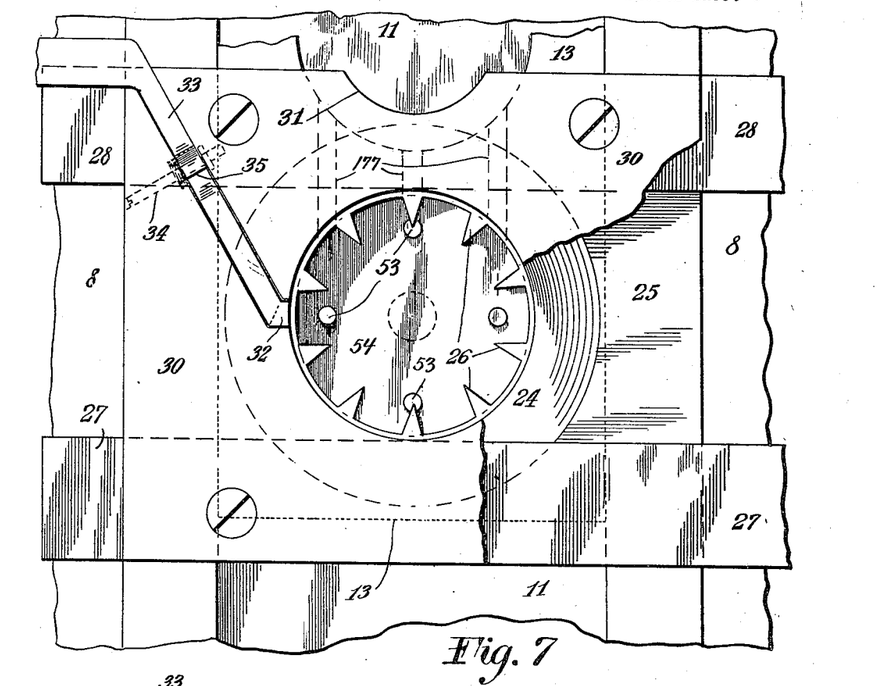
Fig. 7 is a plan view partly broken away of the blanking or cutting die.
Figure 8:
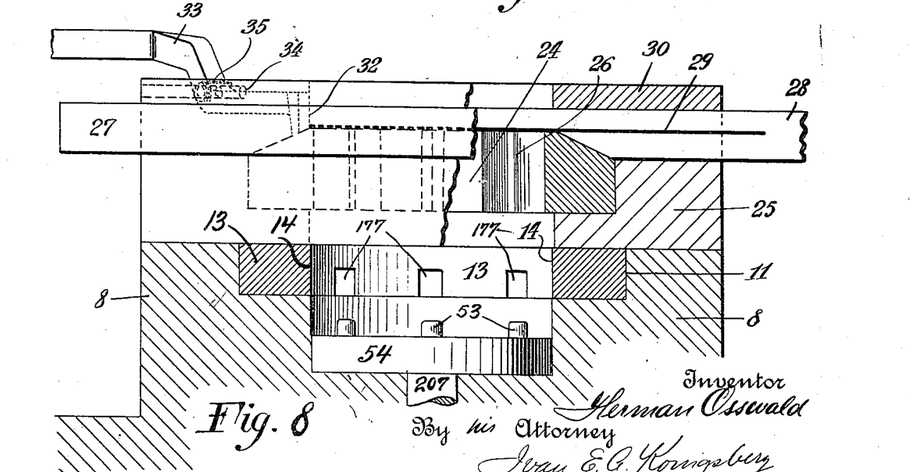
Fig. 8 is view of said blanking or cutting die, partly in section and partly in elevation.

Referring now to Figures 7 and 8 it will be seen that a blanking die 24 is suitably supported in a die base 25 on top of the die bed 8.

The die is provided with equally spaced radical teeth 26 whereby corresponding notches are cut in the blank to provide the split flange as will be understood. Guide bars 27 and 28 extend transversely of the machine and the stock or material 29 is fed into the die between the said bars and under a top plate or stripper plate 30 which is cut out as at 31 to leave room for the adjacent die and punch.

The strip of material 29 is fed from the right in Figure 7 towards the left between the said guide bars and against the depending nose 32 of a movable stop finger 33 pivoted at 34. The stop finger and nose is under tension by a spring 35. As the material is pushed against the nose 32 the latter gives slightly, but sufficiently to sort of jump on top of the end of the strip, being pushed against the latter by the spring 35, the effect being that of a somewhat yielding, yet positive stop for the material. So that the operator simply feeds the material against said stop without having to watch just how far in the material is. The stop finger 33 is operated to move up and out of the way of the material by a pin 87 carried by the slide 4, Figure 2.

Figures 9, 10, 11:
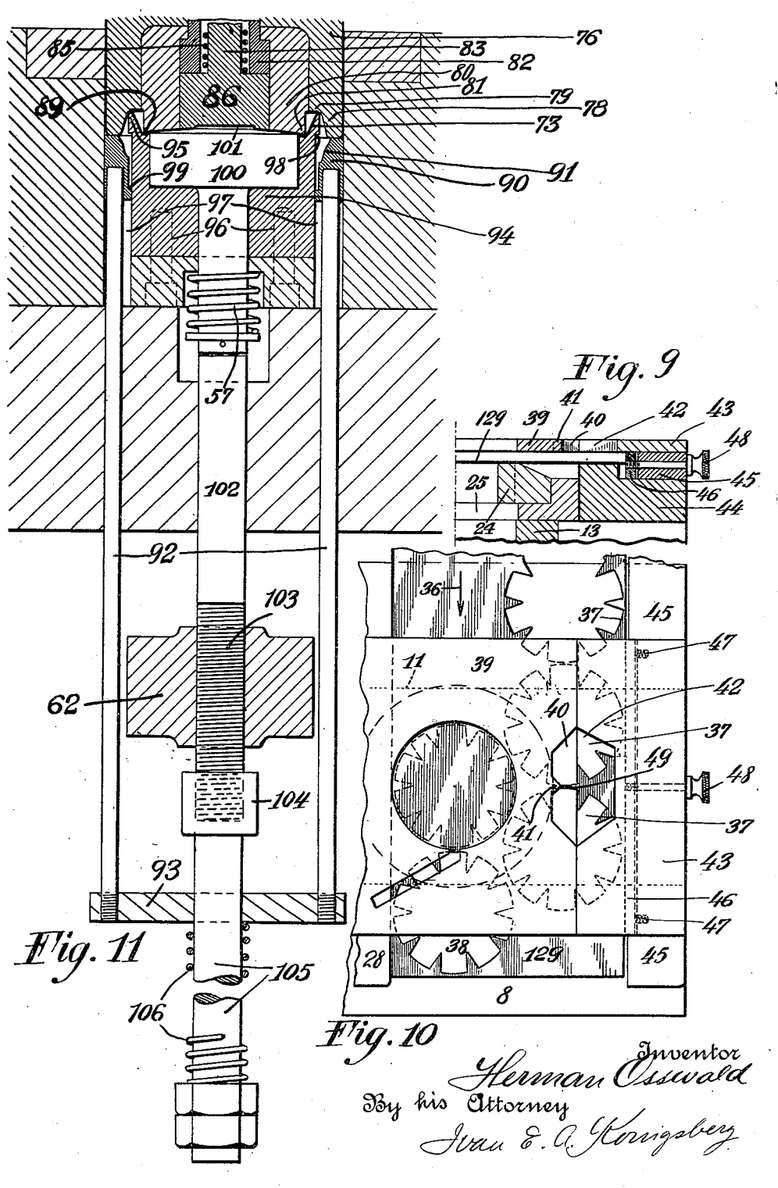
Fig. 9 is a sectional detail view of the cutting die when the blank is cut from double-width stock.
Fig. 10 is a plan view of the parts shown in Figure 9.
Fig. 11 is a sectional view of the crimping die and punch in closed position.

In the event that the material strip is wider the blanks are cut staggered. That is, first a single row of blanks are cut and thereafter the material is run through the press again and a second row of blanks are cut from the strip left by the first row. This is illustrated in Figures 9 and 10 where the feed is in direction of the arrow 36. In this case blanks have been cut at 37, 37 near the one edge of the strip 29. The strip is then turned around and the second row of blanks is being cut at 38.

In this case the stop finger 33 cannot be relied upon to accurately position the material so as to properly stagger the blanks on the strip, and a new top plate 39 is used which is cut out as at 40 and provided with a pointer 41. The cut out 40 registers with a cut out 42 in an auxiliary stop plate 43 which is supported on a base 44, a guide bar 45 being interposed as shown. The guide bar 45 is provided with an adjustable guide piece 46 which is forced inwardly by springs 47 and operated by a screw 48 to adjustably guide the edge of the material as shown. Between each cut out left by the blanks there is left a piece of material marked 49 which is registered with the pointer 41 aforesaid to properly place the material so that the blanks are cut properly staggered without loss of material or badly cut blanks.

Figure 4:
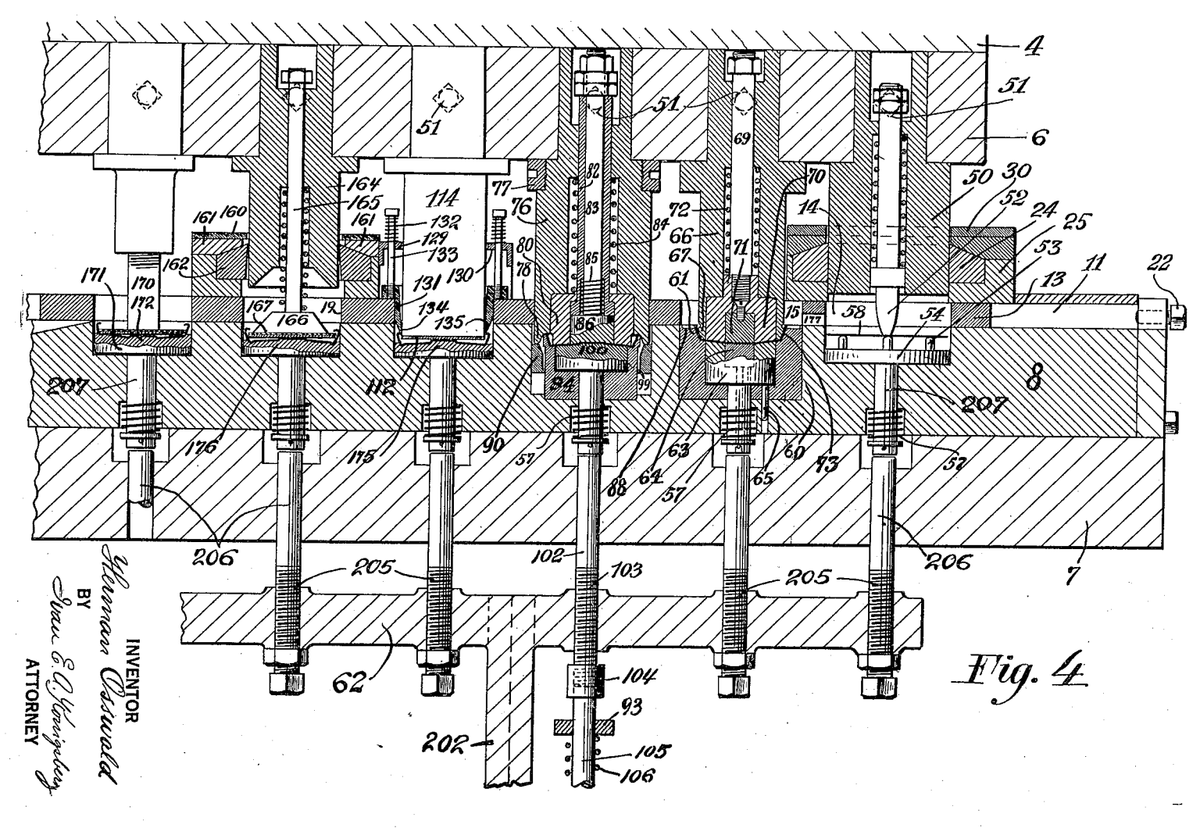
Fig. 4 is a central vertical sectional view of the punches and dies showing the same in closed position.

In order to cut the blanks there is provided a blanking punch 50 held in the punch holder by a set screw 51 and which punch carries a central stripper 52, see Figure 4. As the punch descends the stripper touches the material first and holds it. Thereafter the punch enters the die and cuts the blank. The cut blank, the stripper and the punch moves down within the die as shown and the cut blank is positioned on the pins 53 of the blanking pad 54. The blanking punch is, of course, provided with cutting teeth 55, Figure 5, shaped so as to cut the blank as shown in Figure 10.

The blanking pad is a circular pad 54 adapted to move within a recess in the die bed. The pad is held at the bottom of the recess by a spring 57. It will further be observed that as shown in Figure 4 the blank 58 is held between the pad and the stripper and that the latter and the blank have passed down through the aperture 14 in the transfer slide 13 which at this time is in its rear position.

The second step in making the cap consists in "forming" it. That is, the central portion of the blank is flexed or formed downward in the machine and the split edge is formed or bent upward at an angle to the central portion. Of course, if the article is not a cap but some other kind of article, the forming step will be designed to provide whatever "forming" or other or similar manipulation such article may require. In addition it may be desired to stamp a mark, device or name in the article and such operation may conveniently be done at this time.

Referring to Figure 4 it will be seen that there is provided a forming die 60 having an upstanding wall 61 at the required angular inclination. The die is fixed in the die bed by suitable means. In the die is seated a forming pad 63 which may have a central marking die 64. If desired the said dies may be provided with guide pins 65 in order to properly guide the dies and in particular insuring correct position of the marking die with respect to the article which may not be circular in form. A spring 57 as above mentioned keeps the pad 63 seated in the die as shown. The die 60 is also at the top provided with a depression 88 for receiving the blank from the blanking die as will appear later.

The punch holder carries a forming punch 66 having a forming head or flange 67. The punch is recessed as shown and within it moves a stripper rod 69 which carries a holding head 70 and a marking punch 71. When the punch descends the marking punch 71 and holding head 70 move down in advance of the forming punch 66 because of the spring 72 as will be understood. The combined action of the forming punch elements is shown in Figure 4 in which it will be seen that the blank 58 has been properly formed with an upstanding flange 73, and stamped as desired between the punch 66 and the forming die. When the punch recedes, the holder head and stamping die remain down because of the spring 72 and strips the blank from the forming flange 67.

The third operation is that of crimping if the article calls for such a step. In this instance the crimping of the blank consists in providing a central annular slight bead and also in forming an outer annular bead at the base of the flange 73 so as to stiffen the blank and provide for the flexing or selfclosing feature. See Figure 11. The punch holder carries a crimping punch 76 adjustable vertically by a screw collar 77 and secured by a set screw 51. The lower end of the punch forms a downwardly extending annular wall 78 which merges into a lateral annular flat surface 79. The wall 78 and surface 79 form the crimping members or elements. In a recess in the punch is seated a holding head 80 having an annular bead portion 81. The head 80 is carried by a sleeve 82 within which moves a stripper rod 83. A spring 84 keeps the head 80 down on a shoulder on the sleeve as shown, Figure 4. Another spring 85 urges the stripper rod downward. The stripper rod carries a concave head 86.

The crimping die is of course located directly beneath the crimping punch and comprises an outer crimping die member 90 having an inner annular surface or wall 91 corresponding to the outer shape of the cap so as to form a support for the cap at the beginning of the crimping operation. The member 90 is carried by two or more guide rods 92 secured to a plate 93. Inside the member 90 is located an inner crimping die member 94 having an upstanding wall 95. This inner die member is fixed to the die bed by screws 96 as shown and the aforesaid rods 92 extend through said member which is apertured at 97 for this purpose. The inner and outer crimping die members have cooperating shoulders 98 and 99 which serve as a stop for the upward movement of the outer member as will presently appear. The inner member is cut out to make room for the crimping pad 100 which has an upper convex or raised portion 101 for flexing the blank inwardly into the stripper head 86. A spring 57 keeps the crimping pad seated in the crimping die and against a pin 102, which rests upon another pin 103 screwed into a head 104 of a rod 105 which extends through the aforesaid plate 93. A spring 106 keeps said plate against the head 104. The pin 103 is in threaded engagement with the knock out 62.

The crimping operation is as follows: Normally the crimping punch and die members are in the positions shown in Figure 5 except that the pad 100 is seated in the die under pressure of the spring 57. The outer die member 90 is in its uppermost position under pressure by the spring 106. In this figure the guide rods 92 are omitted. When the crimping punch descends into the die, the parts take the position as shown in Figures 4 and 11 where it will be noted that by the combined action of the punch members and die members, the upstanding flange 73 is crimped or bent inwardly as shown and that the central or body portion of the cap is held firmly by the holding head 80 and the concave head 86 on the stripper rod, while the outer die member moves down and the punch wall 78 and flat annular portion 79 jointly effect the crimping or inward bend of the blank while the bead 81 on the holding head 80 forms a bead 89 in the blank, Fig. 11 at the base of the flange 73.

When the crimping punch 76 moves up, the holding head 80 holds the blank until said head moves up with the punch, while the blank is being held still further by the head 86 on the stripper which is the last member to leave the blank. The outer die member 90 follows the upward movement of the punch under the influence of the spring 106 until the shoulder 99 abuts the shoulder 98. When, as will be explained later, the knock out 62 moves up, the said spring 106 is simply compressed between the rod 105 and the plate 93. As shown in the drawing, nuts are provided on the several bolts, rods and sleeve to adjust the same.

The fourth operation is that of inserting a paper or cardboard disk within the cap. It is, of course, not always required that such an element be added to the article made on the press and the feature of the invention disclosed with reference hereto is illustrative only of the scope of the invention and its application.

Figure 12:
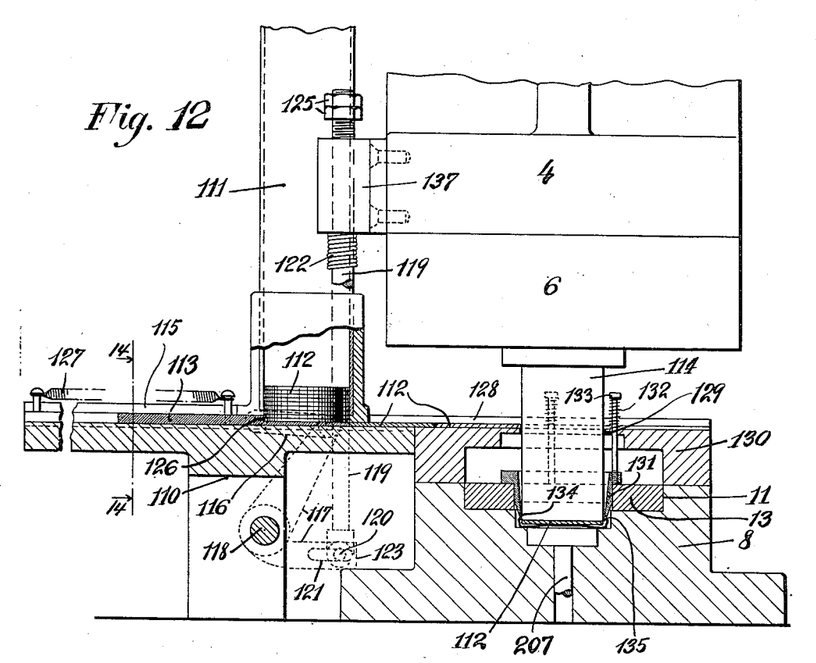
Fig. 12 is front view partly in section of the paper disk magazine and die and punch.
Figures 13, 14:
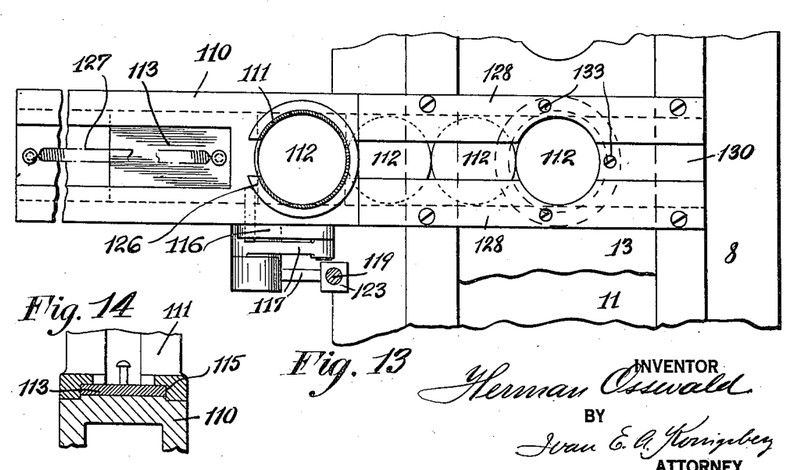
Fig. 13 is a plan view of Figure 12.
Fig. 14 is a sectional view on line 14—14 of Figure 12.

To the one side of the die bed there is mounted a suitable magazine base 110, Figures 12 and 13, which supports a magazine 111 containing the cardboard disks or seals 112. A magazine slide 113 is adapted to slide under and through the magazine to eject the seals therefrom and push them into the path of the seal punch 114 which is carried by the punch holder. The magazine slide 113 is operated in ways 115 by means of a link 116 pivoted to the bell crank 117 pivoted at 118. The bell crank is operated by the rod 119 carried by a bracket 137 secured to the main slide 4. The rod 119 has a pin 120 which operates in a slot 121 in the bell crank 117 and a spring 122 is interposed between the head 123 of the rod and the bracket 137. The tension of the spring and the operating length of the rod may be adjusted by lock nuts 125.

Figure 5:
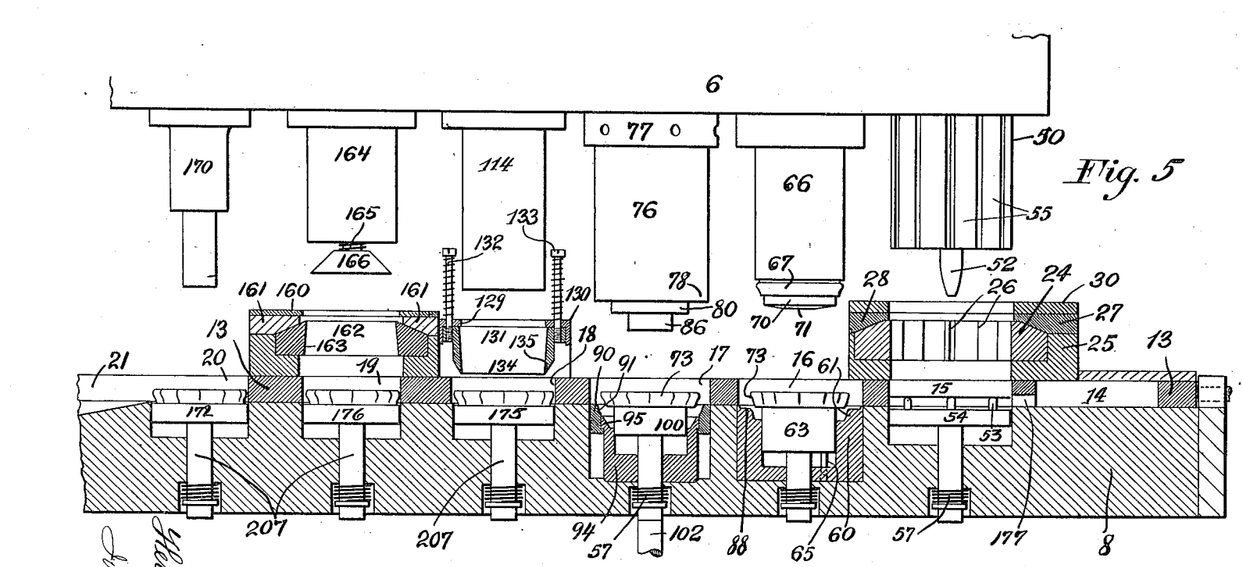
Fig. 5 is a similar view showing the parts in open position.

When the main slide descends, the rod 119 operates the bell crank to cause the magazine slide to carry out from under the magazine one of the cardboard seals. The slide has a movement, equal to the diameter of the seals and is stopped when the head 123 of the operating rod 119 hits the die bed as shown in Figure 12 while at the same time a shoulder 126 on the slide abuts the seals as shown. Further downward movement of the main slide simply compresses the spring 122. When the main slide moves up, the bell crank 117 is oscillated to the left in Figure 12, the magazine slide is also moved to the left, the pin 120 in the bell crank being kept in contact with the slot 121 by a spring 127 which tends to draw the slide leftward as will be understood. When the slide has completed its leftward- or backward-movement, the cardboard seals move down upon the thin part of the slide. Repeated movements result in a continuous automatic feed of the cardboard seals between guides 128 towards the cardboard die where the seal falls through an opening 129 in the die plate 130 and into the cardboard seal die 131 which is held in a normal raised position as shown in Figure 5 by springs 132 on rods or pins 133 which slide through holes in the die plate as shown. The die 131 is slightly funnel shaped and its lower opening 134 is slightly less in diameter than the opening in the cap and the cardboard disk seal is slightly larger than said opening. Thereafter the seal punch 114 descends upon the cardboard seal and on its downward movement after touching the seal, the punch carries down with it the cardboard die until, as shown in Figure 12, the punch forces the disk through the die and into the cap, the pointed annular edge 135 of the die coming to rest upon the crimped flange of the cap. The punch then ascends, also the die and the cardboard seal has been placed within the cap, although seemingly too large to be thus positioned.

In Figure 12 the link 116, bell crank 117 and associated parts have been shown in dotted lines for the sake of illustrating the construction.

The fifth step in the making of the cap consists in placing a paper wafer or disk within the cap. As a matter of nomenclature only this element will herein be called a gasket member.

Figure 15:
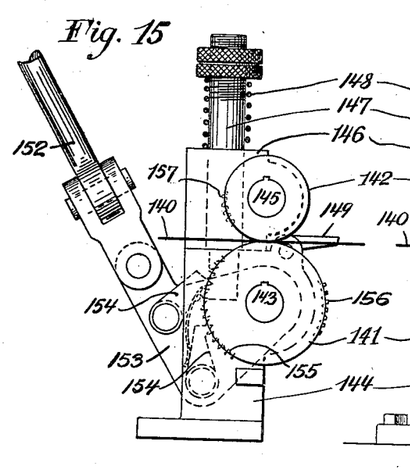
Fig. 15 is a front view of the paper feed mechanism.
Figure 16:
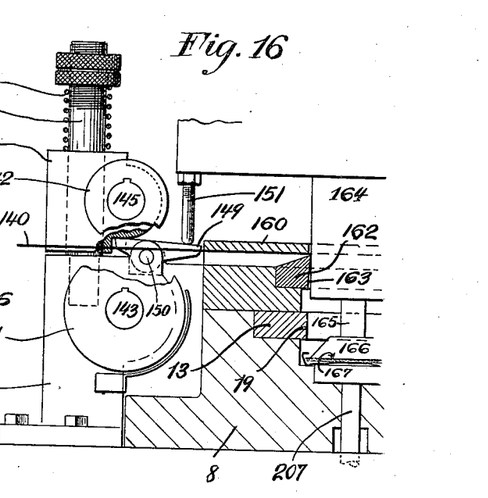
Fig. 16 is a front view of the paper feed mechanism and paper seal die and punch.
Figure 17:
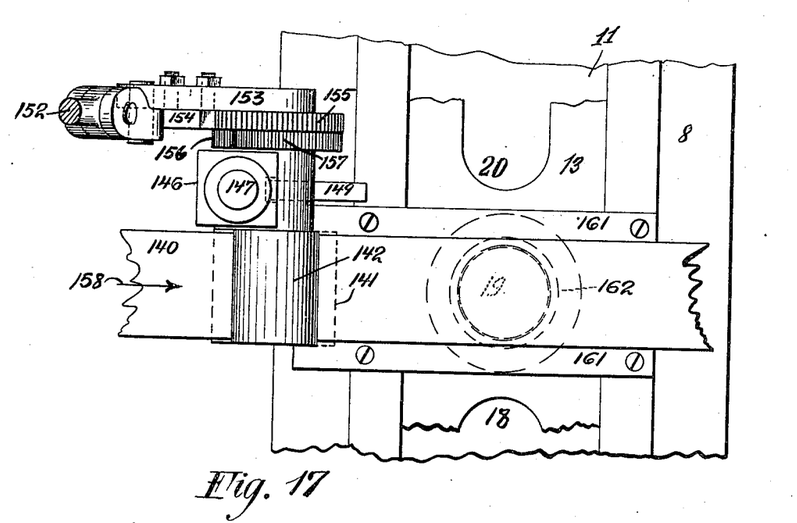
Fig. 17 is a plan view thereof.

The gaskets are cut from a roll of paper which is not illustrated but may be supported on or near the machine as may be convenient. Referring to Figures 15, 16 and 17 the reference numeral 140 denotes a supply of suitable paper in strip form which passes into the machine between feed rolls 141 and 142. The feed roll 141 is fixedly mounted to rotate on a shaft 143 journaled in the housing 144. The feed roll 142 is fixedly mounted on a shaft 145 journaled in the movable bearing 146. The latter is vertically movable on a bolt 147 and the rolls are kept in normal paper feeding contact by a spring 148 as will be understood. The bearing 146 may be lifted against the spring pressure by a lever 149 pivoted at 150 and operated by an adjustable pin 151 secured to the main slide.

The feed rolls are driven intermittently by a rod 152 which actuates a crank 153. The latter carries two pawls 154, 154, which drive a ratchet 155 on the shaft 143. To the latter is further secured a gear 156 which meshes with a gear 157 on the shaft 145. It follows that for each operation of the rod 152, the feed rolls are driven to feed the paper in the direction of the arrow 158 at which time the rolls of course are in contact. But in the intervals between each feeding motion, the slide 4 descends and the pin 151 hits the lever 149 which lifts the upper roll, thereby giving the paper a chance to straighten itself and whereby buckling of the paper is prevented.

The paper is fed underneath the paper stripper plate 160, between paper guides 161 and in over the paper die 162 which is provided with a downwardly and outwardly slightly tapered wall 163. 164 is the paper punch which carries a stripper rod 165 having a head 166. As the punch descends it cuts a circular wafer from the strip of paper and said wafer or gasket member 167 is pushed into the cap by the paper punch stripper head 166.

The sixth or last operation is that of flexing the cap outward or closing it. That is, by pushing the body of the cap downwardly the sides of the cap will be moved inwardly or closed. This is accomplished by having the straight closing punch 170 descend upon the cap and close it on the closing pad 171, see Figure 4. The closing pad is provided with a cooperating or corresponding convex head 172.

Where it has not been especially mentioned it is understood that each die is provided with a pad for receiving the cap and that each pad, hereinafter called knock out pads, is seated in the die or corresponding recess in the die bed by means of a suitable spring 57 as explained in connection with the blanking die. Thus the punch 114 works against a pad 175 and the punch 164 works against a pad 176.

Figure 6:
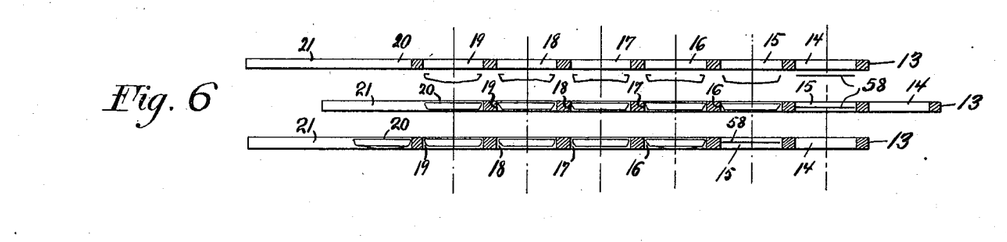
Fig. 6 is a diagrammatic view illustrating one of the important features of the invention, namely the transfer of the blank from one die to another die.

One of the important features of the invention resides in the means for transferring the blank from one die to another which is done in the intervals between each stroke of the press or downward move of the punches. As stated above the transferring slide 13 is the means to accomplish this result. See Figures 4, 5 and 6. When the punches descend the transfer slide is in its rear position and the punches operate through the apertures in said slide numbered 14 to 19. Thereafter the punches move up. The transfer slide 13 moves forward, see Figure 5 and second position in Figure 6. Next the knock out pads lift the several blanks out of the die bed and into the several apertures in the transfer slide. The latter then moves back and the finished cap is discharged through cut out 21 see third position in Figure 6. The punches may then again descend. A new blank will be cut in the blanking die and the several operations will be performed as above outlined.

The operations for a single blank is accordingly as follows: First the blank is cut, then the transfer slide moves forward, then the knock out pad positions the blank in the slide, the latter moves to the rear, the knock out pads descend, thereby placing the blank in the forming die, then the transfer slide moves forward, the punches descend, and the blank is formed (at the same time a new blank is cut), then the punches move up, the transfer slide moves forward, the knock out pad places the former blank in the slide, the latter moves back and transfers the former blank (at the same time transferring the second cut blank) and so on until in other words the blank has been operated on by each punch and die. The knock out pads remain up while the transfer slide moves from the front to the rear or while the transferring takes place. The slide is cut out as at 177 to permit the slide to move over the pins 53 which support the cut blank during the transfer as will be understood from Figure 5.

Figure 1:
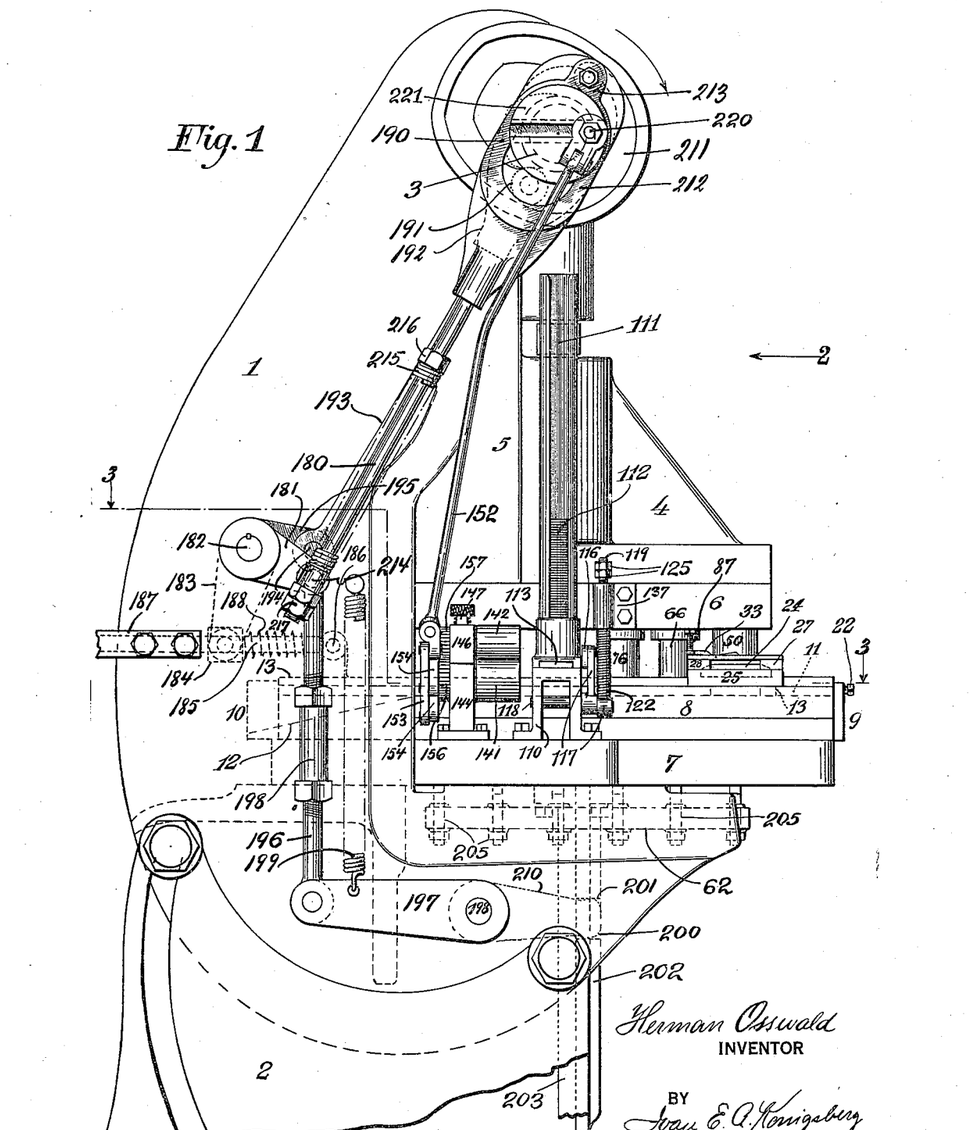
Fig. 1 is a view of the left side of a press embodying my invention with details omitted.
Figure 2:
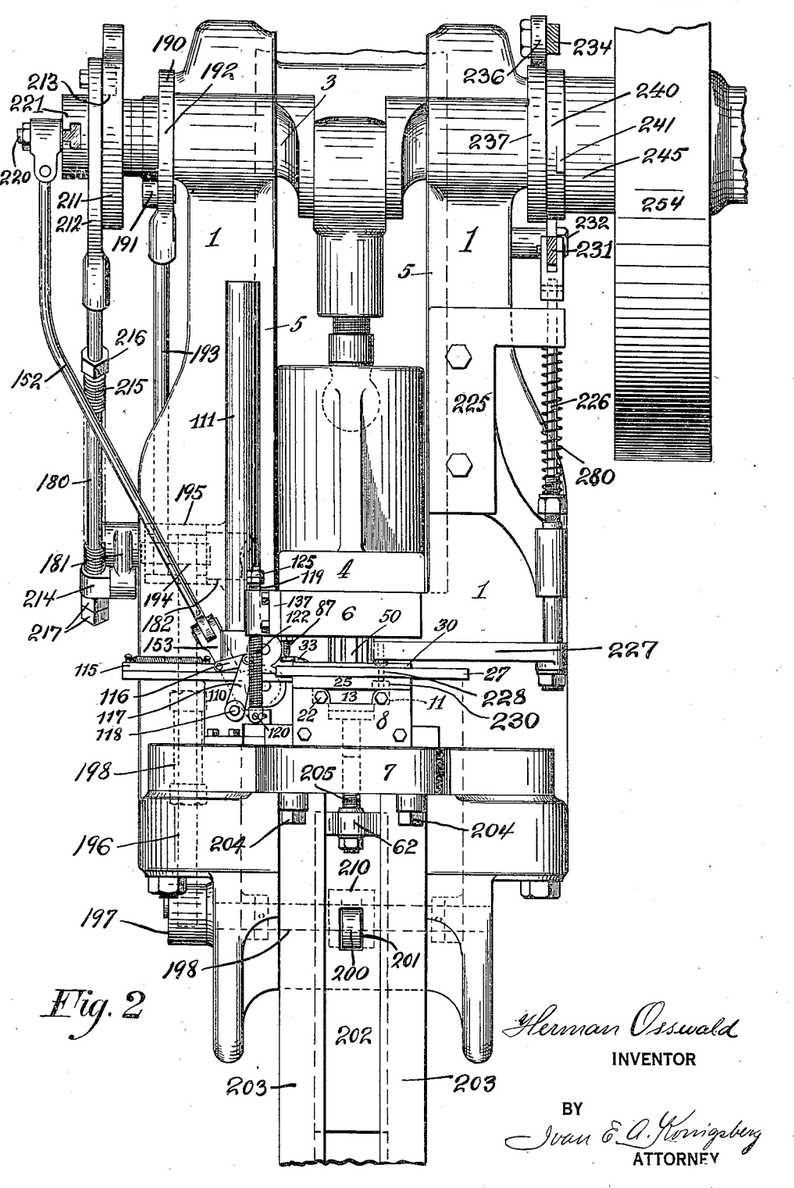
Fig. 2 is a front view of the press looking in direction of arrow 2 in Figure 1.
Figure 3:
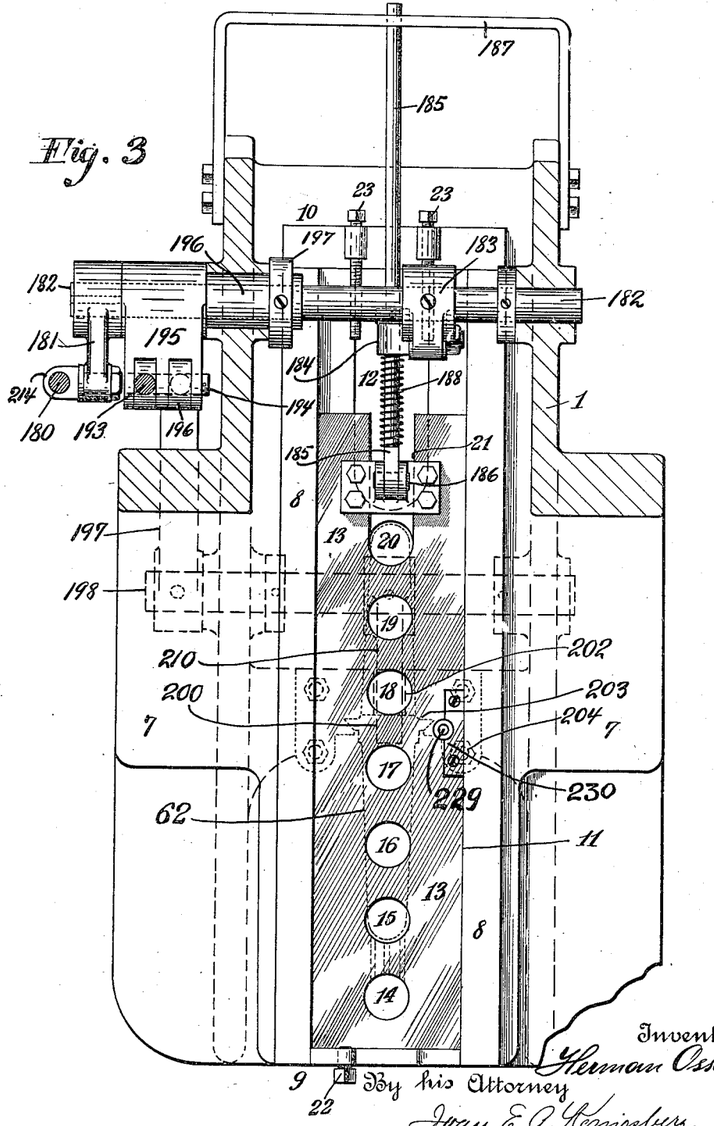
Fig. 3 is a plan view in section taken substantially on the line 3—3 in Figure 1.

The transfer slide is operated from a transfer slide rod 180, see Figures 1, 2 and 3. The rod 180 is pivoted to an arm 181 which is keyed to an auxiliary shaft 182 at the rear of the press. To the said shaft is secured a lever 183 to the lower end of which is pivoted a collar 184. A slide link 185 is pivoted to the transfer slide at 186 and extends through the said collar 184 and through a guide member 187. 188 is a spring interposed between the transfer slide and the collar 184. As the shaft 182 is oscillated, the transfer slide is reciprocated. The spring 188 takes up any movement or stoppage of movement due to accidents at this point.

The knock out pads are operated as follows: To the driving shaft 3 is secured a knock out cam 190. A cam roll 191 runs on the cam and is in turn mounted on the slotted end 192 of a cam rod 193 which is pivoted at 194 to a double forked arm 195 secured to a sleeve 196, Figure 3, which rocks on the auxiliary shaft 182. A collar 197 maintains the sleeve properly spaced or positioned on the shaft. To the said double forked arm 195 and on the said pivot 194 is pivoted the upper end of a link 196, the lower end of which is pivoted to an arm 197. A turnbuckle 198 affords adjustment of the link 196. A spring 199 pulls upwards on the arm 197 and keeps the cam roll 191 on the cam 190. The arm 197 is secured to the knock out shaft 198 which extends transversely through the frame. Centrally of the latter and in alinement with the knock out 62 a knock out lever 210 is secured to the knock out shaft 198. The knock out lever extends forwardly and its head 200 enters a slot 201 in the knock out stem 202 which slides in a knock out base 203 secured to the bolster by bolts as 204. The knock out is in the form of a casting which extends below the dies and in which there is screwed a knock out bolt 205 for each knock out pad in the dies. The bolts, which are adjustably secured as shown in Figure 4, support knock out pins 206 extending through apertures in the bolster and the said pins are adapted to engage the stems 207 of the several pads. The somewhat different construction regarding the crimping die has already been explained.

The knock out cam 190 is so timed that as soon as the punches have been withdrawn from the dies or while they are on their upward movement, the knock out lever, by means of the above described instrumentalities, is moved upwardly and causes the knock out 62 to rise and elevate the knock out pads to bring the blanks into the apertures in the transfer slide 13. The cam is further so designed that the knock out pads remain up while the transfer of the blanks takes place, after which the cam roll 191 runs on the low part of the cam to again lower the knock out pads.

The transfer slide rod 180 is operated from a slide cam 211 also secured to the main shaft 3. To this end the said rod is secured at its upper end to a slotted head 212 which straddles the shaft 3 and to which a cam roll 213 is secured which runs in the cam 211. The lower end of the rod 180 passes through a bracket 214 pivoted in the aforesaid arm 181. A spring 215 acts between the said bracket and a nut 216 in the rod and below the bracket other nuts 217 are provided to adjust the tension of the said spring. As the cam rotates the rod 180 reciprocates to rock the arm 181 to operate the transfer slide 13. The spring 215 keeps the rod 181 in operative engagement with the bracket 214 and arm 181 as will be understood. In case of breakage or accident the rod 180 will slide through the said bracket and the spring 215 will be compressed.

The rod 152 which operates the drive for the paper feed rolls 141 and 142 aforesaid is operated from a crank pin 220 adjustably secured in a crank disc 221 mounted on the end of the shaft 3 as shown in Figures 1 and 2.

One of the objects of this invention is to provide means whereby the press shall be automatically stopped in the event the work, that is the blanks, is not properly positioned for receiving the tools, i. e., the punches. See Figures 2 and 18 to 25 inclusive.

Secured to the frame is a bracket 225, Figure 2, in which a rod 226 is mounted to slide. The rod carries an arm 227 in which is adjustably secured a safety stop pin 228 adapted to enter an aperture or hole 229 in a safety stop plate 230 secured to the transfer slide 13, see Figure 3. The safety rod 226 is pivoted at its upper end to a safety rod arm 231 pivoted on the frame at 232. The free end of said arm is pivoted to a link 233 which in turn is pivoted to a safety cam lever 234. The latter is pivoted to the frame at 235 and carries a cam roll 236 which runs on the safety stop cam 237. The rod is surrounded by a spring 280 which assists in bringing the rod down and keeps the roll 236 on the cam 237.

During the regular operation of the press the safety rod is operated in synchronism with the transfer slide so that the safety pin 228 enters the safety hole 229 once during each revolution of the press. If, however, for some reason or other, the slide 13 is so operated that the stop pin 228 cannot enter the hole 229, the safety rod will of course remain in an elevated abnormal position and a catch 238 on the said arm 231 will remain in the path of a tooth 239 carried by the safety stop 240, Figure 22.

The safety stop is in the form of a ring loosely carried on the shaft 3 and provided with one tooth 239 adapted to cooperate with the said catch 238 and another tooth 241 adapted to cooperate with the switch 242 by engaging a step 243 thereon. The said two teeth are in different planes as shown. Adjacent the safety stop there is pinned to the shaft 3 a clutch ring 245 which is an annular member provided with a groove 246 in which lies a spring 247. The one end of the spring bears against the end 248 of said groove 246. The other end of the spring bears against a lug 249, said lug 249 being the one end of a clutch dog actuating member 250 which is carried in the safety stop 240 and which has a head 251 which plays in a cut out 252 in the safety stop cam 237, see Figures 18 to 22.

Figures 18, 19, 20, 21, 22, 23, 24, 25:
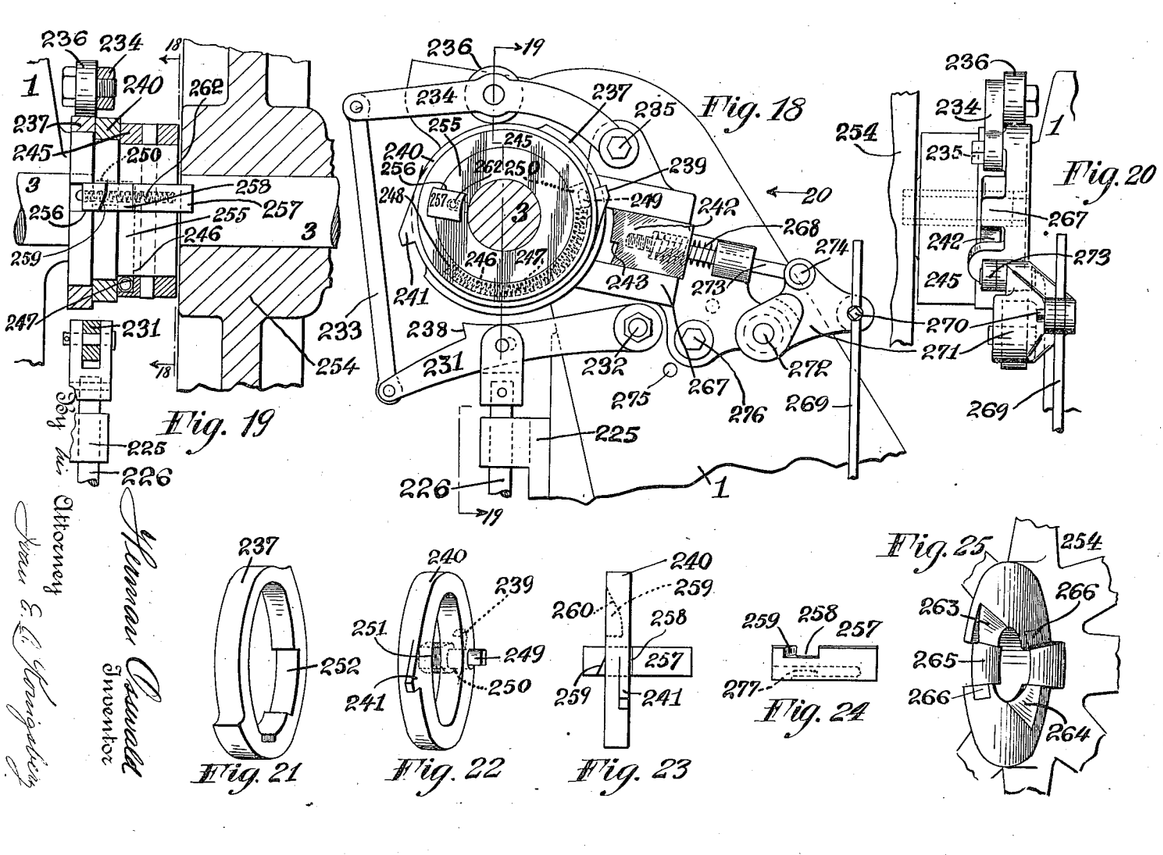
Fig. 18 is a view in elevation of the right side of the press showing the safety stop mechanism with parts in section on the line 18—18 of Figure 19.
Fig. 19 is a sectional view on substantially the line 19—19 of Figure 18.
Fig. 20 is a rear view of Figure 18 looking in the direction of arrow 20 in Figure 18.
Fig. 21 is a perspective view of the safety stop cam used in the safety stop mechanism.
Fig. 22 is a perspective view of the safety stop.
Fig. 23 is a detail view of the safety stop and the clutch dog.
Fig. 24 is a view of the clutch dog.
Fig. 25 is a perspective view of the inside hub portion of the flywheel.

As seen in Figure 18 the shaft 3 is enlarged between the frame 1 and the flywheel 254, the enlarged portion being marked 255. In the latter is cut a groove 256 in which slides the clutch dog 257, Figure 24, which has a notch 258 with a cam surface 259. The notch 258 is of a width equal to the width of the safety stop 240 and the latter occupies the said notch. In addition, the safety stop is provided with a cut out 259 having a cam surface 260. The clutch dog is provided with a recess 277 which is occupied by a spring 262 which tends to move the dog into engagement with the flywheel. The latter is provided with two diametrically opposite sloping or inclined surfaces 263 and 264 which lead into a diametrically cut groove 265 and opposite the said surfaces the flywheel is provided with hardened steel pins of which the heads 266 only appear in Figure 25.

The aforesaid switch 242 is mounted to slide in a housing 167 and is urged towards the clutch mechanism by a spring 268. The switch may be withdrawn from the clutch mechanism by operating the treadle rod 269 which is in pivotal engagement at 270 with an arm 271 pivoted at 272 to which the switch stem 273 is pivoted at 274. The stem 273 is screwed into the switch. Holes 275 are provided in the press frame for securing the switch housing 267 in different adjusted positions by means of a bolt 276.

The operation is as follows: When the press stands still the clutch dog 257 lies wholly within the groove 256 in the shaft and is withdrawn from the flywheel which we will assume is rotating. In this case the switch 242 will be in its forward position, the tooth 241 will be up against the step 243 on the switch and the circular spring 247 will be compressed between the groove 246 and the lug 249, the head 251 of the member 250 being against the one end of the cut out 252 in the safety stop cam 237. The relative position of the safety stop 240 and clutch dog 257 will be as in Figure 23. The dog spring 262 within the recess 277 will be compressed. It is to be noted that in Figures 18, 19 and 20 the parts are shown in running position.

When it is desired to start the press, the operator puts his foot on the treadle, (not shown) and the treadle rod 269 is depressed thereby withdrawing the switch 242 and releasing tooth 241 on the safety stop. Consequently the latter is free to rotate and is thrown in the direction of rotation (anti-clockwise in Figure 18) by the spring 247, which acts between the end 248 of the groove 246 in the clutch ring (which is stationary) and the lug 249 carried by the safety stop 240 (which is loose on the shaft and free to rotate). This movement brings the cut out 259 in the safety stop opposite the clutch dog, consequently the latter is released and the spring 262 throws the clutch dog into engagement with the flywheel, the dog sliding down one of the surfaces 263 or 264 and against one of the hardened steel pins 266. Thus the flywheel is clutched to the shaft and the press starts operating.

During the operation the safety rod lever 231 is operated regularly by the safety stop cam to raise and lower the safety stop pin 228 as explained above. The parts are so timed, that the catch 238 on said lever 231 is down to permit the tooth 239 on the safety stop 240 to pass by, while the tooth 241 cannot engage the step 243 on the switch because the latter is withdrawn.

When the operator takes his foot off the treadle, the switch 242 will be moved inward by the spring 268, consequently said switch will be in the path of the tooth 241 (these two elements being in the same plane) and when they meet, the switch will stop the safety stop 240. Immediately thereafter the rotating clutch dog will run against the cam surface 260 of the safety stop and will be withdrawn from the flywheel and the press will stop. From the moment the stop tooth 241 engages the step 243 on the switch and until the clutch dog has been withdrawn from the flywheel the safety stop cam 237 will keep rotating with the shaft but will not affect the other parts because the cut out 252 in the cam will run over the head 251 until the head reaches the end of said cut out 252 which of course is proportioned so as to be long enough to permit the dog to be disengaged from the flywheel.

Similarly, if during the running of the press, the safety stop pin is unable to properly register and enter the safety hole 229 in the slide 13, the catch 238 on the arm 231 will remain up. The tooth 239 will encounter said catch, the safety stop will be stopped and the clutch dog will be disengaged from the wheel and the press will automatically stop.

It will be understood that the safety mechanism and clutch mechanism work so rapidly, that the press is started and stopped almost instantly when the operator so desires by operating the treadle rod. And the same thing occurs when the safety stop acts.

It will be seen that there is an important advantage in having the safety stop rod operated directly by a cam on the shaft, rather than having it operated by the main slide as has been customary heretofore, in that the action of said safety rod becomes exactly synchronized with the running of the press.

From a foregoing it will be seen that a mechanism has been provided which affords quick and efficient means for shifting the work by very simple apparatus occupying but a small space and positive and exact in its operation. It should again be emphasized that the press as herein disclosed is not limited for the purpose of making caps of the type illustrated, but that the press is adapted for a wide range of work and that I claim all such alterations and changes in the construction of the device as legitimately come within the principle of the invention and the scope of the appended claims.

I wish it also distinctly understood that the machine disclosed in the foregoing is not limited for use on sheet metal only, but that the term sheet metal wherever it occurs in the specification and claims is intended to include sheets of other material such for instance as celluloid, paper, cardboard, leather, fabrikoid and other similar materials and substances.

I claim:

1. In an apparatus for making sheet metal articles of the character set forth, the combination of a plurality of dies, reciprocating means for transferring the said articles from one die to another die, means for supporting said transferring means above all of the said dies, a plurality of punches adapted to enter said dies to shape the articles therein, means for moving the articles from the said dies to the said reciprocating transferring means and means for operating the latter.

2. In an apparatus for making sheet metal articles of the character set forth, the combination of a plurality of dies arranged in a single row, a die bed common to all of said dies for supporting the same, reciprocating means for transferring the said articles from one die to another, apertures formed in said reciprocating means and coinciding with the said dies, a plurality of punches adapted to pass through the said apertures and enter the said dies to shape the said articles therein and below the said transferring means and in one operation, means for lifting the shaped articles from the said dies and into the said apertures and means for operating the said transferring means.

3. In an apparatus for making sheet metal articles of the character set forth, the combination of transferring means, a plurality of dies located immediately below the same, a plurality of punches supported above said dies and transferring means, apertures formed in the latter, means for operating said punches to pass through said apertures and enter the said dies to shape the articles therein and for withdrawing said punches after the articles have been shaped, means for moving said transferring means in one direction to receive the shaped articles, means for positioning the latter within the said apertures in the transferring means and means for immediately thereafter operating the latter in the opposite direction to transfer the shaped articles from one die to another die.

4. In an apparatus for making sheet metal articles of the character set forth, the combination of a plurality of sets of punches and dies, transferring means having apertures through which all of said punches are adapted to enter said dies and a reciprocating member for transferring the said articles from one die to another die.

5. In an apparatus for making sheet metal articles of the character set forth, the combination of a predetermined number of dies, an equal number of punches, a slide for moving the shaped articles from one die to another die, said slide having a number of apertures equal to the number of dies plus one, and means for positioning said slide to cause said punches to pass through the same apertures at each operation of the said apparatus.

6. In an apparatus for making sheet metal articles of the character set forth with a disk of cardboard and a disk of paper therein, the combination of means for simultaneously performing progressive steps in the formation of several of said articles, including means for forming a metal blank into the desired shape, means for placing a disk of cardboard within the said article, means for placing a disk of paper therein, a plurality of dies for holding several articles in different stages of formation in position to be operated upon in proper sequence by all the aforesaid means, a member for progressively transferring the metal articles in their several stages of formation from one die to another die and mechanism for moving said member uninterruptedly the length of its movement in one direction to complete the transfer of the said articles from one die to another die and for similarly moving said member its full movement in the opposite direction to initial position.

7. In an apparatus of the character described the combination of a plurality of dies for shaping metal articles, a plurality of punches adapted to enter said dies to shape the metal articles therein, transferring means operable between said punches and dies and provided with a plurality of apertures through which all of the said punches enter the said dies, mechanism for operating said transferring means into a predetermined rear position before all the punches enter the dies and into a predetermined forward position after the metal articles have been shaped in the dies and the punches withdrawn from the latter, means for simultaneously removing the shaped metal articles from the dies and into operative relation with the said transferring means and supporting the metal articles within the said transferring means both when the latter is in its said forward position and while it is moving into its said rear position.

8. In an apparatus of the character described the combination of a plurality of dies, a plurality of punches adapted to cooperate with said dies to form metal articles, a transferring slide located between said punches and dies, means for lifting the shaped metal articles into position to be transferred by said slide and for supporting said articles within the latter during the transfer and means for operating said slide.

9. In an apparatus of the character described the combination of a plurality of cooperating punches and dies for shaping sheet metal articles, a transferring member, means for removing the shaped articles in their several stages of formation from the said dies and placing them within said transferring member and for supporting them within the latter during the transfer and means for operating said transferring member to transfer said metal articles from one die to another die.

10. In an apparatus of the character described the combination of a plurality of cooperation punches and dies for shaping sheet metal articles, a transferring slide, means for removing the shaped articles in their several stages of formation from the said dies and placing them within said transferring slide and for supporting them within the latter during the transfer and means for moving said transferring slide a full step in one direction to transfer said metal articles from one die to another die and for moving said slide a full step in the other direction to initial position.

11. In an apparatus of the character described the combination of a plurality of cooperating punches and dies for shaping metal articles, a transfer slide, a member within each die for removing the shaped metal articles in their several stages of formation from the said dies and placing them within apertures formed in said transfer member, means for operating the said members simultaneously and means for operating the said transfer member.

12. In an apparatus of the character described the combination of a plurality of cooperating punches and dies for shaping metal articles, a transfer slide, a member within each die for removing the shaped metal articles in their several stages of formation from the said dies and placing them within apertures formed in said transfer member, means for operating the said members simultaneously and means for reciprocating the said transfer member.

13. In an apparatus of the character described the combination of a plurality of cooperating punches and dies for shaping metal articles, a transfer slide operable in a plane above the dies, a knock out pad within each die for lifting the metal articles out of the dies and into position to be acted upon by said transfer slide, mechanism for reciprocating the latter to transfer the said articles from one die into alinement with another die and means for automatically lowering the said knock out pads to reseat the articles within the dies.

14. In an apparatus of the character described, the combination of a plurality of sets of dies and punches for forming sheet metal articles of desired shape from a metal blank, a slide for transferring the blanks from one die to another die and provided with a series of blank receiving apertures and means for reciprocating said slide to register its apertures with the said dies in either one of its extreme positions and automatic means for lifting the blanks out of the said dies and place them within the said apertures.

15. In an apparatus of the character described, the combination of means for forming a cut flat blank into a cap and flexing the central portion of said blank in one direction and means for flexing the central portion of the cap in the opposite direction after the said cap has been formed.

16. In an apparatus of the character described, the combination of a frame, a reciprocatable slide mounted on said frame, a metal blank shaping die supported on said frame, a punch cooperating with said die and carried by the said reciprocatable slide, cardboard disk inserting means including a punch carried by said slide, paper disk cutting and inserting means including a cutter carried by said slide, means for reciprocating the latter, a carrier having a plurality of openings for receiving and transferring the blank in different shapes of formation while the said slide is in one of its extreme positions and means for reciprocating the said carrier a full step uninterruptedly in either direction.

17. In an apparatus of the character described, the combination of a frame, a single slide, a plurality of dies carried by said frame, a plurality of cooperating punches carried by said slide, the punches and dies being adapted to form a finished article of desired shape from a sheet metal blank and being arranged in a single straight row, a transfer slide mounted above the said dies, means below the latter for lifting the blank in its several stages of formation from the said dies into position to be acted upon by the said transfer slide, means for reciprocating the single slide and means for operating said transfer slide to transfer the said blanks while the said main slide is in one of its extreme positions.

18. The process of forming a metal closure comprising an annular holding flange bent at an angle to a flexible center, which consists in cutting a closure blank, forming and crimping the said flange while flexing the said central portion inwardly, and thereafter closing said flange inwardly towards the center of said body while flexing the latter outwardly.

19. In an apparatus for making closures, the combination of a paper cutter adapted to strike a disk from a strip of paper, means for intermittently gripping and feeding forward a strip of paper to be operated upon by said paper cutter, said means including a pair of feed rolls arranged to receive the strip of paper between them, means normally tending to press said rolls together, means for intermittently rotating said rolls, means for separating said rolls during the operation of said paper cutter, means for directing a formed cap into position to receive a disk of paper struck by said paper cutter from the strip of paper and for removing the formed cap after it has received the disk of paper and mechanism for reciprocating the said directing and removing means.

HERMAN OSSWALD.